Sept. 22, 1970 R. F. SCOTT ET AL 3,530,053
METHOD OF PREPARING A CADMIUM SULFIDE THIN FILM FROM AN AQUEOUS SOLUTION
Filed Jan. 11, 1968
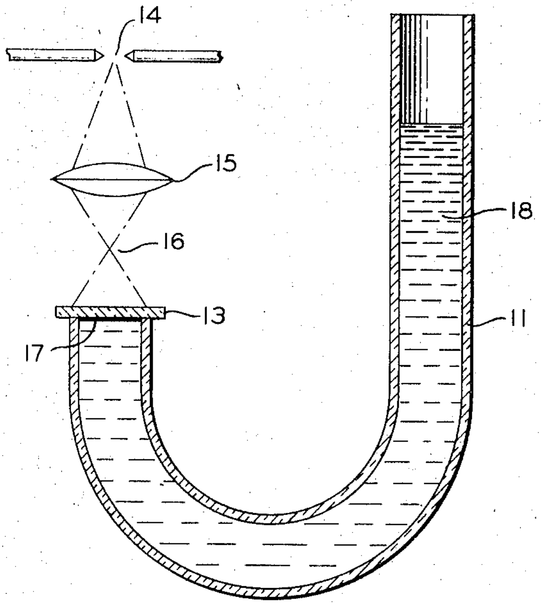
INVENTORS R. F. SCOTT
R. J. STRAIN
BY
R B Anderson
ATTORNEY

United States Patent Office 3,530,053

Patented Sept. 22, 1970

3,530,053

METHOD OF PREPARING A CADMIUM SULFIDE THIN FILM FROM AN AQUEOUS SOLUTION

Richard F. Scott, North Plainfield, and Robert J. Strain, Plainfield, N.J., assignors to Bell Telephone Laboratories, Incorporated, Murray Hill, N.J., a corporation of New York Filed Jan. 11, 1968, Ser. No. 697,130

Int. Cl. B01j *1/10*

U.S. Cl. 204—157.1 6 Claims

ABSTRACT OF THE DISCLOSURE

An improved photoconductive cadmium sulfide film is grown on a suitable substrate by contacting the substrate with an aqueous solution of ammonia, thiourea, a cadmium salt, and a copper salt, and by illuminating the solution during the growth process with a high intensity light.

BACKGROUND OF THE INVENTION

This invention relates to cadmium sulfide films and more particularly to photoconductive cadmium sulfide films that are grown from an aqueous solution.

In several articles in the English translation of Kolloidyni Zhurnal, at vol. 23, pp. 366–368 (1961) and vol. 27, pp. 38–41 and pp. 317–320 (1965), S. G. Mokrushin and others describe a process for growing cadmium sulfide films from solution. The films are grown on a suitable substrate from an aqueous solution of ammonia, sodium hydroxide, thiourea and cadmium salt in which a double buffering effect takes place. In such a solution, cadmium tetrammine, formed from cadmium ions and ammonia, is slowly hydrolyzed to form cadmium hydroxide:

$$[Cd(NH_3)_4]^{2+}+2[OH]^- \rightleftarrows Cd(OH)_2+4NH_3$$

At the same time, thiourea decomposes to form, among other things, hydrogen sulfide:

$$NH_2CSNH_2+2H_2O \rightleftarrows 2NH_3+CO_2+H_3S$$

Because of the high hydroxyl ion concentration in this solution, the hydrogen sulfide is ionized; and cadmium sulfide is formed by interaction of the sulfur ions with cadmium ions:

$$Cd^{2+}+S^{2-} \rightleftarrows CdS$$

The cadmium sulfide is a colloidal suspension that precipitates onto the substrate where it forms an unoriented film of crystallites, each of which is less than approximately 100 A. in each dimension. Because the crystallites are so small, the film is, in effect, amorphous. By using sodium hydroxide, which is found to speed up the growth of the cadmium sulfide film by increasing the hydroxyl ion concentration, Mokrushin and his associates grow suitable films from a solution that is spent in four to six hours. However, it is known that some of the sodium combines with the cadmium sulfide film where it causes a relatively long photoconductivity decay time.

For some purposes, however, it is desirable to produce within a reasonably short processing time, a cadmium sulfide film having a relatively short photoconductivity decay time.

SUMMARY OF THE INVENTION

Accordingly, it is an object of our invention to produce an improved photoconductive cadmium sulfide film with a shorter photoconductivity decay time.

This and other objects of our invention are achieved in an illustrative embodiment thereof by forming an aqueous solution of ammonia, thiourea, a cadmium salt and a small amount of a copper salt. This solution is then illuminated with a high intensity light to grow the improved cadmium sulfide film on a suitable substrate. Within two to four hours, the solution is spent and a film is formed that is thick enough for device applications. The photoconductivity decay time of this film is on the order of tens of microseconds, which is two orders of magnitude shorter than that of presently known films.

BRIEF DESCRIPTION OF THE DRAWING

This and other objects and features of our invention can best be understood from the following detailed description taken in conjunction with a schematic illustration of the apparatus used to grow a photoconductive cadmium sulfide film according to an illustrative embodiment of our invention.

DETAILED DESCRIPTION OF THE DRAWING

Referring now to the drawing, there is shown apparatus for making photoconductive films in accordance with an illustrative embodiment of the invention comprising a J-shaped tube 11 with a transparent substrate 13 cemented onto the open end of its shorter branch. An intense light source 14, such as a mercury vapor lamp and a lens 15, are so positioned that when operating they direct an intense beam of light 16 through substrate 13 into tube 11.

To grow a photoconductive cadmium sulfide film 17 on substrate 13, a solution 18 is first prepared having the concentrations detailed in Table I.

TABLE I

| Constituent | Stock concentration, molar | Amount used cc. | Ultimate concentration, Molar |
|---|---|---|---|
| $H_2O$ | | 9.0 | |
| $NH_4OH$ | 14.7 | 6.0 | .88 |
| Cadmium salt | 0.1 | 1.0 | .001 |
| $(NH_2)_2CS$ | 0.5 | 2.0 | .01 |
| Copper salt | 0.01 | 0.1–0.4 | $10^{-5}$–$4\times10^{-5}$ |

The cadmium salt may be any stable, water soluble salt such as cadmium sulfate, cadmium fluoride, cadmium chloride, cadmium bromide, cadmium iodide, cadmium nitrate or cadmium acetate. Similarly the copper salt may be any stable, water soluble salt such as copper sulfate, copper fluoride, copper chloride, copper bromide, copper nitrate or copper acetate. Of these salts, we prefer to use the nitrates of cadmium and copper and have also found cadmium chloride to be especially satisfactory. Note also that the solution contains no sodium hydroxide but that it does contain a small amount of a copper salt as well as ammonia, thiourea and a cadmium salt. Because this solution has a very delicate balance and is sensitive to such impurities as carbon dioxide that might be found in the water, carbon-dioxide-free distilled water should be used.

The concentrations indicated are those that we have found to be best. Within limits, variations from these concentrations are, of course, possible; but the films grown from such solutions are not as good. Specifically, if the concentration of only one constituent is varied without varying the concentration of the others, then a five to ten percent variation in the concentration of either the cadmium salt or the ammonia is tolerable. As suggested in discussing the background of the invention, these narrow limits on concentration are caused by the fact that the hydroxyl ion concentration controls the speed of the reaction and the ammonia and cadmium ion concentration in this solution control the hydroxyl ion concentration. As might be expected, the concentration limits for the thiourea are less stringent.

After solution 18 is prepared, it is poured into tube 11 in such a way as to avoid forming air bubbles near the substrate. Inasmuch as the surface of substrate 13 that is in contact with the solution is located advantageously at the top of the branch of the tube on which it is situate, any particles in the solution will settle to the base of tube 11 rather than onto substrate 13 where they would cause imperfections in the film that is grown thereon.

Because growth of the cadmium sulfide film from this solution without more is not satisfactory, the intense light beam 16 is directed through substrate 13 to catalyze the reaction in the solution adjacent the substrate. Catalysis, however, does not occur at any wavelength of light; for we have learned that only light having a wavelength shorter than approximately 5000 A. produces preferential growth of the cadmium sulfide film on that part of the substrate it illuminates. Of course, the lower limit to the wavelength of light is that imposed by the transparency of water. With the solution of Table I and with light having an intensity from approximately one to approximately ten milliwatts/cm.$^2$, a suitable cadmium sulfide film 17 approximately 500 A. or more thick is produced in two to four hours.

The reactions that take place to produce this film are similar to those that take place in the solutions used by Mokrushin and his associates. In our solution, however, the hydroxyl ion concentration is considerably lower because there is no sodium hydroxide in the solution. Moreover, there is a copper salt in the solution, and the solution is illuminated. The film that is produced is likewise similar to the Mokrushin film in that it is composed primarily of unoriented cadmium sulfide crystallites that are so small that the film can be considered amorphous. However, because there is no sodium hydroxide in the aqueous solution from which our film is grown, there is no sodium in the film to cause a relatively long photoconductivity decay time. And because a copper salt is contained in the aqueous solution, the cadmium sulfide film that is formed is copper-doped and has an extremely fast photoconductivity decay time on the order of tens of microseconds.

We have also observed that it is possible to grow thicker films by growing layers of cadmium sulfide on previously deposited layers of cadmium sulfide. The first layer is grown following the procedures detailed above. After the film has grown for a normal length of time and the solution has accordingly depleted itself, the depleted solution is exchanged for a fresh solution, and the growth process continues. The second layer will be about as thick as the first layer. Even more layers can be grown, one on top of the other by using additional solutions.

As will be obvious to those skilled in the art, the growth processes described above can be adapted to large scale production. For example, the cadmium sulfide film can be grown on a plurality of substrates each of which is floated on an aqueous thiourea solution contained in a tank. A suitable lighting source, or sources, provides the necessary illumination to catalyze the reaction that deposits the film on the substrate. As each thiourea solution is spent, it must, of course, be replaced. This may be done by slowly but continuously flowing fresh solution through the tank. At the same time, the substrates floating on the surface of the solution slowly move through the tank, the desired thickness of the cadmium sulfide film grown on each substrate being attained just as the substrate moves out of the illumination from the light source.

Alternatively, the films could be prepared on the substrates a batch at a time. In this case, although the substrates once again float on the surface of the solution, they are prevented from moving by appropriate means. Fresh solution flows continuously past the substrates until a film of desired thickness is grown. At this point, the whole batch of substrates is removed from the tank. Simultaneously, a second batch is moved into the tank and the cycle is repeated as many times as is desired. Many modifications in these processes will be obvious to those skilled in the art.

As we have described, variations can be made in the concentration of the aqueous solution and in the specific cadmium and copper salts used therein. Likewise, we have found that the cadmium sulfide films can be grown on almost any inorganic substrate that is not water soluble. In particular, we have used substrates made of quartz, sapphire, platinum, mica, barium titanate, glass microscope slides and, of course, cadmium sulfide films. There are also several alternative ways to illuminate the substrate on which the cadmium sulfide film is grown and to position the substrate within the solution. These and other modifications and embodiments may be made by those skilled in the art without departing from the spirit and scope of the invention.

What is climed is:

1. A method of preparing on a substrate a photoconductive film of cadmium sulfide that comprises the steps of:

forming an aqueous solution of ammonia, thiourea, a stable, water soluble cadmium salt and a stable, water soluble copper salt and contacting the substrate with said solution;

illuminating the solution adjacent the substrate with light of a wavelength of less than approximately 5000 A., thereby forming on the substrate the film of cadmium sulfide; and drying the substrate bearing the cadmium sulfide film.

2. A method of preparing on a substrate a photoconductive film of cadmium sulfide that comprises the steps of:

forming an aqueous solution of ammonia, thiourea, a cadmium salt and a copper salt, said solution being in contact with the substrate, wherein the cadmium salt is selected from a group consisting of cadmium nitrate, cadmium sulfate, cadmium acetate, cadmium fluoride, cadmium chloride, cadmium bromide and cadmium iodide and the copper salt is selected from a group consisting of copper nitrate, copper sulfate, copper acetate, copper fluoride, copper chloride and copper bromide;

illuminating the solution adjacent the substrate with light of a wavelength of less than approximately 5000 A., thereby forming on the substrate the film of cadmium sulfide; and drying the substrate bearing the cadmium sulfide film.

3. The method of claim 2 wherein the concentration of the elements of the solution is approximately:

| | Molar |
|---|---|
| Ammonium hydroxide | .88 |
| Thiourea | .01 |
| Cadmium salt | .001 |
| Copper salt | $10^{-5}$ to $4\times10^{-5}$ |

4. The method of claim 2 wherein the illuminating light has an intensity of approximately one to approximately ten milliwatts per cm.$^2$.

5. The method of claim 2 comprising the additional step of:

replacing the first aqueous solution after it has become depleted with a second aqueous solution of ammonia, thiourea, a cadmium salt and a copper salt wherein the cadmium salt is selected from a group consisting of cadmium nitrate, cadmium sulfate, cadmium acetate, cadmium fluoride, cadmium chloride, cadmium bromide and cadmium iodide and the copper salt is selected from a group consisting of copper nitrate, copper sulfate, copper acetate, copper fluoride, copper chloride and copper bromide.

6. A photoconductive film of cadmium sulfide prepared on a substrate by:

forming an aqueous solution of ammonia, thiourea, a stable, water soluble cadmium salt and a stable, water soluble copper salt and contacting the substrate with said solution;

illuminating the solution adjacent the substrate with light of a wavelength of less than approximately 5000 A., thereby forming on the substrate the film of cadmium sulfide; and drying the substrate bearing the cadmium sulfide film.

References Cited

UNITED STATES PATENTS 3,281,264 10/1966 Cope et al. ------ 204—157.1 X

HOWARD S. WILLIAMS, Primary Examiner

U.S. Cl. X.R.

117—93.3